United States Patent
Kim et al.

(10) Patent No.: US 12,162,795 B2
(45) Date of Patent: *Dec. 10, 2024

(54) COATING COMPOSITION HAVING HIGH LIGHT TRANSMITTANCE, COATING GLASS AND METHOD FOR PREPARATION THEREOF, AND COOKING APPLIANCE USING SAME

(71) Applicant: LG Electronics Inc., Seoul (KR)

(72) Inventors: Taehee Kim, Seoul (KR); Dongwan Seo, Seoul (KR); Taeho Kim, Seoul (KR); Ju Hyeong Kim, Seoul (KR); Yongsoo Lee, Seoul (MN)

(73) Assignee: LG Electronics Inc., Seoul (KR)

(*) Notice: Subject to any disclaimer, the term of this patent is extended or adjusted under 35 U.S.C. 154(b) by 1051 days.

This patent is subject to a terminal disclaimer.

(21) Appl. No.: 16/925,736

(22) Filed: Jul. 10, 2020

(65) Prior Publication Data

US 2021/0009468 A1 Jan. 14, 2021

(30) Foreign Application Priority Data

Jul. 10, 2019 (KR) ........................ 10-2019-0083493

(51) Int. Cl.
*C03C 17/23* (2006.01)
*A47J 27/00* (2006.01)
*C03C 17/00* (2006.01)

(52) U.S. Cl.
CPC ............. *C03C 17/23* (2013.01); *A47J 27/002* (2013.01); *C03C 17/001* (2013.01);
(Continued)

(58) Field of Classification Search
None
See application file for complete search history.

(56) References Cited

U.S. PATENT DOCUMENTS 6,896,934 B2   5/2005   Aronica et al.
7,005,396 B2   2/2006   Espargilliere et al.
(Continued)

FOREIGN PATENT DOCUMENTS

EP   2662339   11/2013
EP   2662341   11/2013
(Continued)

OTHER PUBLICATIONS

Translated Abstract for Hoshida JP56155040 (Year: 1981).*
(Continued)

*Primary Examiner* — Michael Forrest
(74) *Attorney, Agent, or Firm* — Fish & Richardson P.C.

(57) ABSTRACT

A cooking appliance includes a cooking chamber, a door that is configured to open and close the cooking chamber and has a door glass, a coating layer that is disposed at least one surface of the door glass and made of a coating composition. The coating composition includes 20 to 40 wt % of phosphorus pentoxide ($P_2O_5$), 15 to 30 wt % of aluminum oxide ($Al_2O_3$) and zirconium dioxide ($ZrO_2$), 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO).

8 Claims, 2 Drawing Sheets

(52) U.S. Cl.
CPC .. *C03C 2217/214* (2013.01); *C03C 2217/216* (2013.01); *C03C 2217/22* (2013.01); *C03C 2217/228* (2013.01); *C03C 2217/23* (2013.01); *C03C 2217/70* (2013.01)

(56) References Cited

U.S. PATENT DOCUMENTS

| | | |
|---|---|---|
| 2003/0187118 A1 | 10/2003 | Aronica et al. |
| 2005/0014625 A1 | 1/2005 | Espargilliere et al. |
| 2005/0148722 A1 | 7/2005 | Aronica et al. |
| 2007/0232476 A1 | 10/2007 | Siebers et al. |
| 2009/0142602 A1* | 6/2009 | Medwick ............ C03C 17/3644 428/428 |
| 2010/0130342 A1 | 5/2010 | Siebers et al. |
| 2013/0299482 A1 | 11/2013 | Kim et al. |
| 2013/0299483 A1 | 11/2013 | Kim et al. |
| 2013/0299484 A1 | 11/2013 | Lee et al. |
| 2018/0290915 A1 | 10/2018 | Damewood et al. |
| 2019/0263716 A1 | 8/2019 | Kim et al. |

FOREIGN PATENT DOCUMENTS

| | | | | |
|---|---|---|---|---|
| JP | 56155040 A | * | 12/1981 | ............... C03C 8/04 |
| KR | 1020140115562 | | 10/2014 | |
| KR | 10-2018-0089988 | | 8/2018 | |
| KR | 10-2019-0103664 | | 9/2019 | |

OTHER PUBLICATIONS

EP extended European search report, in European Appln. No. 20185257.1, dated Nov. 26, 2020, 7 pages.

PCT International Search Report in International Appln. No. PCT/KR2020/009071, dated Oct. 30, 2020, 9 pages.

Shkurakova and Yatsenko, "Phase Composition and Structure of Aluminum—Coating Composite," XP-001220731, Glass and Ceramics, May 2004, 61(5-6):203-205.

Office Action in Korean Appln. No. 10-2019-0083493, mailed on Jan. 24, 2024, 12 pages (with English translation).

* cited by examiner

COATING COMPOSITION HAVING HIGH LIGHT TRANSMITTANCE, COATING GLASS AND METHOD FOR PREPARATION THEREOF, AND COOKING APPLIANCE USING SAME

CROSS-REFERENCE TO RELATED APPLICATION

This application claims priority to and the benefit of Korean Patent Application No. 10-2019-0083493, filed on Jul. 10, 2019, the disclosure of which is incorporated herein by reference in its entirety.

TECHNICAL FIELD

The present disclosure relates to a coating composition having a high light transmittance, coating glass, a method for preparation the coating glass, and a cooking appliance using the same.

BACKGROUND

Cooking appliances such as electric ovens and gas ovens may cook food or other items (hereinafter, collectively "food") using a heat source. In some cases, contaminants may be produced during cooking and attached to an inner wall of a cavity and an inner surface of a door of a cooking appliance. Accordingly, the inner wall of the cavity and the inner surface of the door may be cleaned. In some examples, a coating layer is disposed on the inner wall of the cavity or the inner surface of the door of the cooking appliance to help to remove the contaminants attached to the cooking appliance.

In some cases, the door of the cooking appliance may include door glass such that users can look into the cooking appliance. In some cases, contaminants produced during cooking may also be attached to the door glass. To help to clean a surface of the door glass, a coating layer may be disposed on an inner surface of the door glass. However, in some cases, a coating layer may have a low light transmittance in which users may not be able to clearly look into the cooking appliance.

In some cases, a coating may be cleaned under a condition of a high temperature or soaking, which may be inapplicable to door glass because the glass door may not be soaked in water and cleaned at the high temperature.

SUMMARY

The present disclosure describes a coating composition that may have a high light transmittance.

The present disclosure also describes a coating composition that may help to remove contaminants with a wet kitchen scrubber, for example.

The present disclosure further describes a manufacturing method for coating a coating composition on a glass substrate such as door glass of a cooking appliance.

According to one aspect of the subject matter described in this application, a cooking appliance includes a cooking chamber, a door that is configured to open and close the cooking chamber and has a door glass, a coating layer that is disposed at least one surface of the door glass and made of a coating composition. The coating composition includes 20 to 40 wt % of phosphorus pentoxide ($P_2O_5$), 15 to 30 wt % of aluminum oxide ($Al_2O_3$) and zirconium dioxide ($ZrO_2$), 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO).

Implementations according to this aspect may include one or more of the following features. For example, the coating composition may further include 5 or less wt % of at least one of lithium oxide ($Li_2O$), barium oxide (BaO), or calcium oxide (CaO). In some examples, the coating composition includes 17 to 29.5 wt % of Al2O3, and 0.5 to 3 wt % of $ZrO_2$. In some examples, the coating composition may include 10 to 20 wt % of $Na_2O$, and 5 to 10 wt % of $K_2O$.

In some examples, a calcination temperature of the coating composition may be less than or equal to 700° C. In some examples, a light transmittance of the door glass for visible light may be greater than or equal to 80%.

In some implementations, the at least one surface of the door glass may be configured to face the cooking chamber. In some examples, the coating composition may be coated on and in direct contact with the at least one surface of the door glass.

According to another aspect, a method for manufacturing coating glass includes providing a substrate that includes glass, applying a coating composition to the substrate, thermally treating the coating composition on the substrate at a temperature less than or equal to 700° C., and cooling the coating composition on the substrate. The coating composition includes 20 to 40 wt % of phosphorus pentoxide ($P_2O_5$), 15 to 30 wt % of aluminum oxide ($Al_2O_3$) and zirconium dioxide ($ZrO_2$), 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO).

Implementations according to this aspect may include one or more of the above features for the coating composition or one or more of the following features. For example. The method of claim 6, the coating composition may further include 5 or less wt % of at least one of lithium oxide ($Li_2O$), barium oxide (BaO), or calcium oxide (CaO). In some examples, the coating composition may include 17 to 29.5 wt % of $Al_2O_3$, and 0.5 to 3 wt % of $ZrO_2$. In some examples, the coating composition may include 10 to 20 wt % of $Na_2O$, and 5 to 10 wt % of $K_2O$. In some examples, a light transmittance of the coating glass for visible light is greater than or equal to 80%.

In some implementations, the method may include providing ammonium dihydrogen phosphate ($NH_4H_2PO_4$) as a raw material of $P_2O_5$, providing sodium carbonate ($Na_2CO_3$) as a raw material of $Na_2O$, providing potassium carbonate ($K_2CO_3$) as a raw material of $K_2O$, and providing lithium carbonate ($Li_2CO_3$) as a raw material of $Li_2O$. In some examples, the method may include providing barium carbonate ($BaCO_3$) as a raw material of BaO, and providing calcium carbonate ($CaCO_3$) as a raw materials CaO.

According to another aspect, a coating composition includes 20 to 40 wt % of phosphorus pentoxide ($P_2O_5$), 15 to 30 wt % of aluminum oxide ($Al_2O_3$) and zirconium dioxide ($ZrO_2$), 10 to 30 wt % of sodium oxide ($Na_2O$) and potassium oxide ($K_2O$), 10 to 25 wt % of boron trioxide ($B_2O_3$), and 10 to 15 wt % of zinc oxide (ZnO).

Implementations according to this aspect may include one or more of the above features for the coating composition. For instance, the coating composition may further include 5 or less wt % of at least one of lithium oxide ($Li_2O$), barium oxide (BaO), or calcium oxide (CaO). In some examples, the coating composition may include 17 to 29.5 wt % of $Al_2O_3$, and 0.5 to 3 wt % of $ZrO_2$. In some examples, the coating composition may include 10 to 20 wt % of $Na_2O$, and 5 to 10 wt % of $K_2O$. In some examples, a calcination temperature of the coating composition is less than or equal to 700° C.

In some implementations, components may be balanced with each other and may perform their functions, thereby ensuring a high light transmittance and an excellent cleaning performance.

In some implementations, the coating composition may have a high light transmittance, thereby enabling users to look into a door.

In some implementations, a surface having the coating composition may be cleaned at a low temperature without being soaked in water.

In some implementations, the coating composition may be coated onto a glass substrate, such as door glass of a cooking appliance by a process to reduce cost for manufacturing a coated glass substrate.

DETAILED DESCRIPTION

Figure 1:
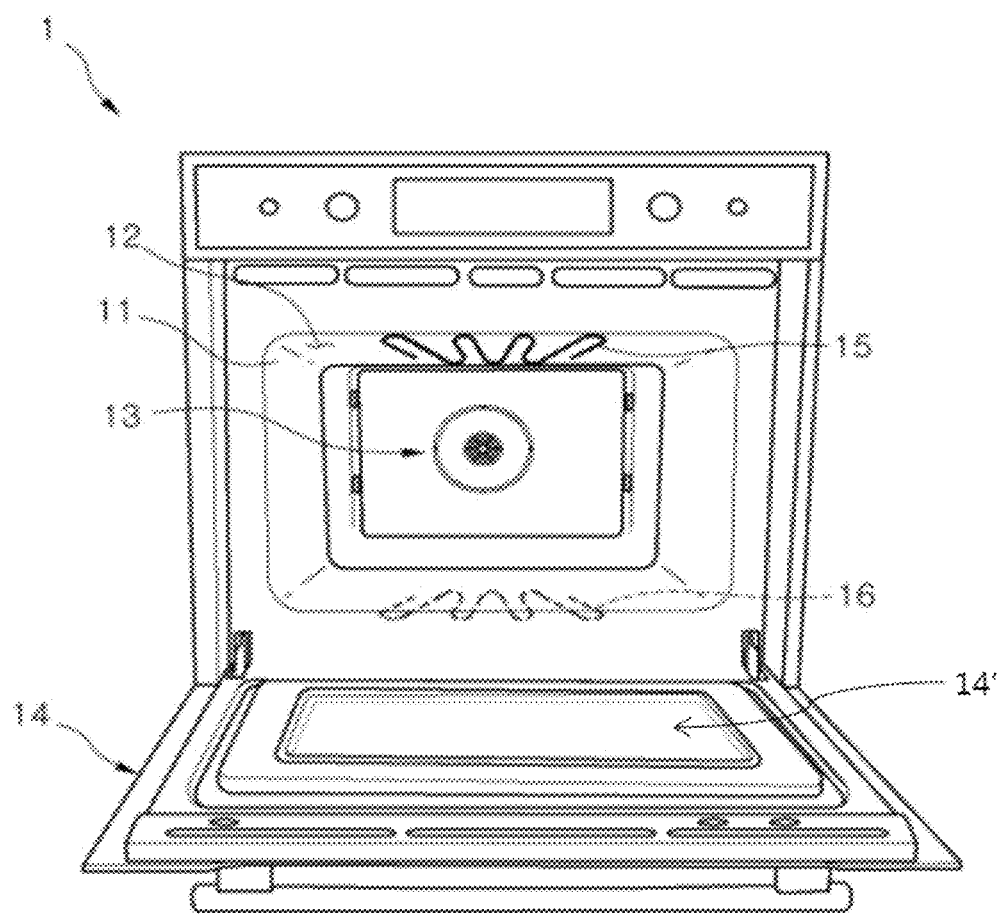
FIG. 1 is a front perspective view of an example of a cooking appliance.

The above-described aspects, features and advantages are specifically described with reference to the accompanying drawings hereunder such that one having ordinary skill in the art to which the present disclosure pertains may easily implement the technical spirit of the disclosure. In description of the disclosure, detailed description of known technologies in relation to the disclosure is omitted if it is deemed to make the gist of the present disclosure unnecessarily vague. Below, one or more implementations according to the present disclosure are specifically described.

The implementations set forth herein may be implemented in various different forms, and should not be construed as being limited to the present disclosure. Rather, these implementations are provided as examples so that the present disclosure will be thorough and complete and will fully convey the subject matter to one having ordinary skill in the art to which the disclosure pertains. Below, a coating composition, coating glass and a method for preparation thereof, and a cooking appliance using the same according to the present disclosure are described specifically.

One or more examples of coating compositions of materials are described below.

In some implementations, a coating composition may include: 20 to 40 wt % of phosphorus pentoxide ($P_2O_5$); 15 to 30 wt % of aluminum oxide ($Al_2O_3$) and zirconium dioxide ($ZrO_2$); 10 to 30 wt % of sodium oxide ($Na_2O$) and potassium oxide ($K_2O$); 10 to 25 wt % of boron trioxide ($B_2O_3$); and 10 to 15 wt % of zinc oxide (ZnO).

$P_2O_5$ is a component that may form a glass structure. $P_2O_5$ is also a glass former that may help addition of a large amount of transition metal oxides into a coating composition, and helps water to permeate between a surface of a coating and a contaminant such that the contaminant is easily removed. In some implementations, $P_2O_5$ may performs a function of improving light transmittance of the coating. $P_2O_5$ may be included in a range of 20 to 40 wt %. When more than 40 wt % of $P_2O_5$ is included, the coating composition is hardly glazed, and thermal properties of the coating composition may be deteriorated. When less than 20 wt % of $P_2O_5$ is included, light transmittance and a cleaning performance of the coating may be degraded.

$Al_2O_3$ and $ZrO_2$ are components that may improve durability of phosphate-based glass and may enhance surface hardness of the coating. $Al_2O_3$ and $ZrO_2$ are included in a range of 15~30 wt %. When more than 30 wt % of $Al_2O_3$ and $ZrO_2$ is included, adhesion and light transmittance of the coating may decrease. When less than 15 wt % of $Al_2O_3$ and $ZrO_2$ is included, physical and chemical durability of the coating may decrease.

A larger amount of $Al_2O_3$ may be included than an amount of $ZrO_2$. According to implementations, when 17 to 29.5 wt % of $Al_2O_3$ is included and 0.5 to 3 wt % of $ZrO_2$ is included, desired light transmittance and durability of the coating may be ensured. For example, when 0.5 to 3 wt % of $ZrO_2$ is included, physical and chemical durability of the coating may be excellently maintained while transmittance of the coating is not degraded.

$Na_2O$ and $K_2O$ may decrease a calcination temperature of the coating composition while improving a cleaning performance of the coating composition. $Na_2O$ and $K_2O$ may be included in the coating composition in a range of 10 to 30 wt %. When more than 30 wt % of $Na_2O$ and $K_2O$ is included, a calcination temperature of the coating composition may not decrease, and a coating performance of the coating composition may decrease. When less than 10 wt % of $Na_2O$ and $K_2O$ is included, a cleaning performance of the coating composition may be deteriorated.

In some examples, a larger amount of $Na_2O$ may be included than an amount of $K_2O$. For example, when 10 to 20 wt % of $Na_2O$ is included and 5 to 10 wt % of $K_2O$ is included, an excellent cleaning performance and a low calcination temperature of the coating may be ensured.

$B_2O_3$ may serve as a glass former and help each component of the coating composition to melt uniformly. $B_2O_3$ also enhances physical and thermochemical durability of the coating. $B_2O_3$ is included in a range of 10 to 25 wt %. When more than 25 wt % of $B_2O_3$ is included, the component may interfere with the addition of other components, thereby deteriorating a cleaning performance and failing to ensure a high light transmittance. When less than 10 wt % of $B_2O_3$ is included, glass composition may be collapsed, and crystallization of the glass may occur.

ZnO is a component that may enhance light transmittance of the coating composition. In some implementations, the coating composition may comprise 10 to 15 wt % of ZnO. The coating composition may comprise a larger amount of ZnO than a coating composition of the related art to maximize light transmittance of the coating. Additionally, in the coating composition, amounts of other components except ZnO are adjusted to maximize light transmittance and ensure excellent cleaning performance and durability. When less than 10 wt % of ZnO is included, a high light transmittance may not be ensured. When more than 15 wt % of ZnO is included, the component may interfere with the addition of other components, thereby causing a deterioration of cleaning performance and durability of the coating.

When an amount of ZnO increases among the coating components, a coefficient of thermal expansion of the coating may increase, and the coating may have cracks. Additionally, due to a chemical unbalance based on the increase in the amount of ZnO, the coating layer may melt in an acidic solution or an alkaline solution and its mark may be left. To solve the problem, an optimal amount of $ZrO_2$ is included in the coating composition. $ZrO_2$ is a component that helps glass to be crystalized easily. The coating composition according to implementations may comprise an optimal amount of $ZrO_2$ such that the coating layer does not left its mark although it melts in an acidic solution or an alkaline solution.

In some implementations, the coating composition may further comprise 5 or less wt % of one or more of lithium oxide ($Li_2O$), barium oxide (BaO) and calcium oxide (CaO). The one or more of $Li_2O$, BaO and CaO may control thermalphysical properties, for example, such as a coefficient of thermal expansion, thermal resistance and calcination temperature of the coating. When more than 5 wt % of one or more of $Li_2O$, BaO and CaO is included, the components may interfere with the addition of other components, thereby failing to ensure a high transmittance.

In some implementations, the coating composition may have a composition ratio as described above, thereby ensuring high light transmittance and excellent cleaning performance of the coating. Additionally, the coating composition may have thermal properties in which the coating composition is calcinated at a temperature of 700° C. or lower.

One or more examples of a method for preparing coating glass and coating glass prepared using same are described below.

In some implementations, a method for preparing coating glass may include: preparing a substrate including glass; applying a coating composition onto the substrate; thermally treating the substrate and the coating composition; and cooling the substrate and the coating composition. The step of thermally treating the substrate and the coating composition is performed at a temperature of 700° C. or lower, and the above-described coating composition may be used as the coating composition.

For example, tempered glass may be used as the substrate such that the substrate is used for home appliances, for example, such as a cooling appliance.

As described above, the coating composition according to implementations may have thermal properties in which the coating composition is calcinated at a temperature of 700° C. or lower. Accordingly, the substrate and the coating composition may be thermally treated at the temperature of 700° C. or lower, thereby enabling calcination of the coating composition and tempering of the substrate at the same time.

Coating glass manufactured using the above-described preparing method may have 80% or greater of visible light transmittance.

An example of a cooking appliance is described below.

In some implementations, referring to FIG. 1, a cooking appliance 1 according to implementations may include: a cavity 11 in which a cooking chamber is formed; and a door 14 that opens and closes the cooking chamber, wherein the door 14 includes a door glass 14', any one surface of which is provided with a coating layer 17, and the coating layer 17 is formed based on the above-described coating composition.

Referring to FIG. 1, the cooking appliance 1 according to implementations may include at least one of heat sources 13, 15, 16 that supplies heat for heating an object to be cooked in the cooking chamber, for example, in addition to the cavity 11 in which the cooking chamber is formed and the door 14 that opens and closes the cooking chamber.

The cavity 11 may have a cuboid shape, a front surface of which is open. The heat sources 13, 15, 16 may include a convection assembly 13 that discharges heated air into the cavity 11, an upper heater 15 disposed at an upper portion of the cavity 11, and a lower heater 16 disposed at a lower portion of the cavity 11. The upper heater 15 and the lower heater 16 may be provided inside or outside of the cavity 11. In some examples, the cooking appliance 1 may not include all of the convection assembly 13, the upper heater 15, and the lower heater 16. For example, the cooking appliance 1 may include any one or more of the convection assembly 13, the upper heater 15, or the lower heater 16. In some examples, the upper heater 15 and the lower heater 16 may include a metal wire or rod that are curved one or more times. In some examples, the convection assembly 13 may include a fan or a blower that supplies hot air to the cavity 11.

Figure 2:
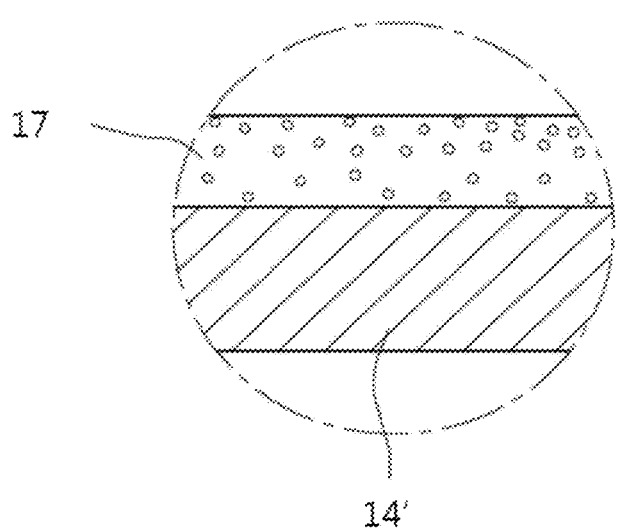
FIG. 2 is an enlarged cross-sectional view of an example of a door glass of the cooling appliance in FIG. 1.

Referring to FIG. 2, the coating composition may be coated on any one surface of the door glass 14'.

Hereinafter, example implementations will be described.

Examples of coating glass may be prepared as follows.

Materials for the coating composition according to the present disclosure and comparative examples may be prepared as shown in Table 1.

For example, ammonium dihydrogen phosphate ($NH_4H_2PO_4$) may be used as a raw material of $P_2O_5$. Sodium carbonate ($Na_2CO_3$), potassium carbonate ($K_2CO_3$), and lithium carbonate ($Li_2CO_3$) may be respectively used as raw materials for $Na_2O$, $K_2O$, and $Li_2O$. Additionally, barium carbonate ($BaCO_3$) and calcium carbonate ($CaCO_3$) may be respectively used as a raw materials of BaO and CaO. Components shown in table 1 were used as the rest components.

The materials in table 1 were melted at 1300° C. for 30 minutes and then quenched. Next, D50 of the quenched materials were ground such that the quenched materials were less than 10 μm.

Next, the ground materials were mixed with ethyl cellulose and then homogenized using a 3-roll mill. Accordingly, a paste including a coating composition was prepared.

Next, the paste was applied onto soda-lime glass of 200×200 mm, and a thickness of 5T was thermally treated at 700° C. for five minutes, to prepare coating glass.

TABLE 1

| Component | Examples according to implementations of the disclosure | | | | Comparative examples | |
|---|---|---|---|---|---|---|
| (wt %) | 1 | 2 | 3 | 4 | 1 | 2 |
| $P_2O_5$ | 31 | 31 | 31 | 31 | 55 | 45 |
| $Al_2O_3$ | 18 | 19 | 19 | 19 | 20 | 40 |
| $B_2O_3$ | 13.5 | 11 | 11 | 11 | 5 | 5 |
| $Na_2O$ | 13 | 13 | 13 | 13.75 | 0 | 0 |
| $K_2O$ | 8.5 | 8 | 8 | 8 | 0 | 0 |
| $Li_2O$ | 0 | 2 | 3 | 2 | 4 | 0 |
| ZnO | 13.5 | 13 | 13 | 13 | 6 | 6 |
| $ZrO_2$ | 2.5 | 2 | 2 | 2 | 3 | 1 |
| BaO | 0 | 0.75 | 0 | 0 | 4 | 2 |
| CaO | 0 | 0.25 | 0 | 0.25 | 3 | 1 |

Experimental results of the examples are described below.

Performance of the examples according to the above-described implementations and comparative examples may be evaluated as follows.

For example, vitrification properties of coating layers and any damage done to coating layers were evaluated.

To evaluate vitrification of a coating layer, any formation of a crystal of the coating layer, formed by the coating composition, was observed.

To confirm damage to the coating layer, any crack in the coating layer formed on glass, which was a base material, was observed.

TABLE 2

|  | Any vitrification | Any damage to coating layer |
|---|---|---|
| Implementation 1 | ○ | X |
| Implementation 2 | ○ | X |
| Implementation 3 | ○ | X |
| Implementation 4 | ○ | X |
| Comparative example 1 | ○ | ○ |
| Comparative example 2 | X | X |

Table 2 shows that the coating layers of implementations 1 to 4 were all formed into non-crystalline ones, and no crack was made in the coating layer formed on the base material.

However, the coating layer of comparative example 2 was hardly transformed into glass due to crystallization caused by an increase in amounts of $Al_2O_3$ and the like. Additionally, the coating layer of comparative example 1 was damaged because the coating layer had cracks due to a difference in coefficients of thermal expansion of the glass as a base material and the coating composition when the coating layer was formed on the base material.

Calcination temperatures of the coating layer were measured.

To confirm any calcination of the coating layer, it was observed whether the coating layer was calcinated at about 700° C. that is a temperature of tempering of glass as a base material.

When being applied to a cooking appliance, for example, glass as a base material may be tempered to improve strength and to ensure safety of users. A calcination process of the coating layer may be performed at the same time as the tempering process of the glass as a base material is performed.

In this case, to confirm any calcination of the coating layer, it was observed whether the coating layer was calcinated at the glass tempering temperature.

TABLE 3

| Samples | Any calcination of coating layer |
|---|---|
| Implementation 1 | ○ |
| Implementation 2 | ○ |
| Implementation 3 | ○ |
| Implementation 4 | ○ |
| Comparative example1 | X |
| Comparative example 2 | X |

Table 3 shows that the coating layers according to implementations 1 to 4 were calcinated at about 700° C. that is a heating temperature for tempering of glass.

Accordingly, the calcination process of the coating layers according to implementations 1 to 4 may be performed at the same time as the glass tempering process is performed. Thus, an additional calcination process may be omitted, thereby improving processing efficiency.

In some cases, where the coating layer is formed after the tempering process, a glass chemical connection of the coating layer, tempered at a calcination temperature, may be broken. However, as the calcination process of the coating layers according to implementations 1 to 4 may be performed at the same time as the glass tempering process is performed, the above-described problem may be solved.

The coating layers according to comparative examples 1 and 2 were not calcinated at about 700° C. that is a heating temperature for tempering of glass. That is, the coating composition of the coating layers according to comparative examples 1 and 2 was calcinated at a temperature higher than 700° C.

Accordingly, the calcination process of the coating layers according to comparative examples 1 and 2 may not be performed at the same time as the glass tempering process is performed. Thus, an additional calcination process of a coating layer is required, thereby deteriorating processing efficiency.

Further, as the coating layer is additionally formed after the tempering process, a glass chemical connection of the coating layer tempered at the calcination temperature may be broken, and strength of the glass may decrease.

Light transmittances of coating layers may be measured as follows.

To measure light transmittance of the coating layer, transmittance of light in a visible light range having a wavelength range of about 380 nm to about 780 nm was measured using a UV visible spectrophotometer.

Light transmittance of glass as a base material before the coating layer was coated was about 80%. After the coating layer was formed, visible light transmittance of the glass, on which the coating layer was formed, was measured using the UV visible spectrophotometer.

TABLE 4

| Samples | Visible light transmittance (%) |
|---|---|
| Implementation 1 | 82.1 |
| Implementation 2 | 84.4 |
| Implementation 3 | 83.7 |
| Implementation 4 | 83.5 |
| Comparative example1 | Impossible to measure |
| Comparative example 2 | 20 |

Table 4 shows that tempered glass, on which coating layers according to implementations 1 to 4 were formed, had visible light transmittance of 80% or higher. That is, when the tempered glass on which the coating layer is formed is applied to a cooking appliance and the like, users may easily and clearly look into the cooking appliance from the outside with the naked eyes.

However, tempered glass on which coating layers according to comparative examples 1 and 2 were formed had low visible light transmittance. That is, when the tempered glass on which the coating layer is formed is applied to a cooking appliance and the like, users may not easily and clearly look into the cooking appliance from the outside with the naked eyes.

Cleaning performances of the examples were evaluated.

For example, a cleaning performance of the coating layer may be evaluated as follows.

A surface of the coating layer was washed with distilled water or alcohol, for example, and then a jig for applying contaminants was disposed on the coating layer. Then the contaminants were thinly applied on a surface area (10 mm×10 mm) of the coating layer with a brush and then were fixed.

In this case, monster mash or chicken fat was used as the contaminants.

Then, the hardened contaminant was cleaned with a wet kitchen scrubber, using a force of 3 kgf or less. As in table 5, frequency of back and forth cleaning motions made to the hardened contaminant was measured and the frequency was defined as a frequency of back and forth cleaning motions. Table 6 below shows indices of the evaluation.

TABLE 5

| Frequency of back and forth cleaning motions | Level |
|---|---|
| 5 or less | 5 |
| 10 or less | 4 |
| 15 or less | 3 |
| 25 or less | 2 |
| More than 25 | 1 |

TABLE 6

| | Cleaning performance |
|---|---|
| Implementation 1 | 4 |
| Implementation 2 | 5 |
| Implementation 3 | 5 |
| Implementation 4 | 5 |
| Comparative example 1 | Impossible to measure |
| Comparative example 2 | 1 |

Table 5 and 6 show that the tempered glass having the coating layers according to implementations 1 to 4 had an improved cleaning performance.

That is, the coating layers according to implementations 1 to 4 may have a maximum level of hydrophilicity on the basis of an optimal range of composition ratios of the coating composition, thereby ensuring ease of removing contaminants attached to a surface of the coating layer only with a wet kitchen scrubber.

The coating layers of the implementations may have improved hydrophilicity and may help water to effectively permeate onto an interface between the coating layer and contaminants on the coating layer when being washed, thereby ensuring ease of removing the contaminants from the coating layer.

However, the coating layers of comparative examples 1 and 2 have low hydrophilicity. Accordingly, contaminants on the coating layers of the comparative examples 1 and 2 may not be easily removed with a wet kitchen scrubber.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking appliance, comprising:
    a cooking chamber;
    a door configured to open and close the cooking chamber, the door comprising a door glass; and
    a coating layer disposed at least one surface of the door glass and made of a coating composition, the coating composition comprising:
        20 to 40 wt % of phosphorus pentoxide ($P_2O_5$),
        15 to 30 wt % of aluminum oxide ($Al_2O_3$) and zirconium dioxide ($ZrO_2$),
        10 to 30 wt % of sodium oxide ($Na_2O$) and potassium oxide ($K_2O$),
        10 to 25 wt % of boron trioxide ($B_2O_3$), and
        13 to 15 wt % of zinc oxide (ZnO).

2. The cooking appliance of claim 1, wherein the coating composition further comprises:
    5 or less wt % of at least one of lithium oxide ($Li_2O$), barium oxide (BaO), or calcium oxide (CaO).

3. The cooking appliance of claim 1, wherein the coating composition includes 17 to 29.5 wt % of $Al_2O_3$, and 0.5 to 3 wt % of $ZrO_2$.

4. The cooking appliance of claim 1, wherein the coating composition includes 10 to 20 wt % of $Na_2O$, and 5 to 10 wt % of $K_2O$.

5. The cooking appliance of claim 1, wherein a calcination temperature of the coating composition is less than or equal to 700° C.

6. The cooking appliance of claim 1, wherein a light transmittance of the door glass for visible light is greater than or equal to 80%.

7. The cooking appliance of claim 1, wherein the at least one surface of the door glass is configured to face the cooking chamber.

8. The cooking appliance of claim 1, wherein the coating composition is coated on and in direct contact with the at least one surface of the door glass.

* * * * *